United States Patent
Zaidi

(10) Patent No.: US 11,719,803 B2
(45) Date of Patent: Aug. 8, 2023

(54) BEAM STEERING RADAR WITH ADJUSTABLE LONG-RANGE RADAR MODE FOR AUTONOMOUS VEHICLES

(71) Applicant: Metawave Corporation, Carlsbad, CA (US)

(72) Inventor: Abdullah Ahsan Zaidi, San Diego, CA (US)

(73) Assignee: METAWAVE Corporation, Carlsbad, CA (US)

( * ) Notice: Subject to any disclaimer, the term of this patent is extended or adjusted under 35 U.S.C. 154(b) by 75 days.

(21) Appl. No.: 16/920,246

(22) Filed: Jul. 2, 2020

(65) Prior Publication Data

US 2021/0003691 A1    Jan. 7, 2021

Related U.S. Application Data

(60) Provisional application No. 62/869,899, filed on Jul. 2, 2019.

(51) Int. Cl.
| | |
|---|---|
| *G01S 13/42* | (2006.01) |
| *G01S 7/41* | (2006.01) |
| *G01S 7/35* | (2006.01) |
| *G01S 13/931* | (2020.01) |
| *G01S 13/34* | (2006.01) |

(52) U.S. Cl.
CPC .............. *G01S 13/426* (2013.01); *G01S 7/35* (2013.01); *G01S 7/412* (2013.01); *G01S 13/931* (2013.01); *G01S 7/417* (2013.01); *G01S 13/343* (2013.01); *G01S 13/42* (2013.01)

(58) Field of Classification Search
CPC .......... G01S 13/426; G01S 7/35; G01S 7/412; G01S 13/931; G01S 7/417; G01S 13/343; G01S 13/42

See application file for complete search history.

(56) References Cited

U.S. PATENT DOCUMENTS

| | | | |
|---|---|---|---|
| 2017/0371030 A1* | 12/2017 | Pokrass | G01S 13/0209 |
| 2018/0095173 A1* | 4/2018 | Kurono | G01S 13/343 |
| 2019/0324134 A1* | 10/2019 | Cattle | G01S 7/032 |
| 2020/0324713 A1* | 10/2020 | Lee | B60R 11/04 |
| 2020/0326427 A1* | 10/2020 | Crouch | G01S 17/42 |
| 2020/0400810 A1* | 12/2020 | Cho | G01S 13/9047 |
| 2021/0209453 A1* | 7/2021 | Meissner | G01S 7/417 |
| 2021/0278522 A1* | 9/2021 | Kitamura | G01S 13/288 |
| 2021/0389448 A1* | 12/2021 | Miyaoka | G01S 13/345 |

* cited by examiner

*Primary Examiner* — Timothy A Brainard
*Assistant Examiner* — Ismaaeel A. Siddiquee
(74) *Attorney, Agent, or Firm* — Sandra Lynn Godsey

(57) ABSTRACT

Examples disclosed herein relate to a beam steering radar for use in an autonomous vehicle. The beam steering radar has a radar module with at least one beam steering antenna, a transceiver, and a controller that can cause the transceiver to perform, using the at least one beam steering antenna, a first scan of a field-of-view (FoV) with a first number of chirps in a first radio frequency (RF) signal and a second scan of the FoV with a second number of chirps in a second RF signal. The radar module also has a perception module having a machine learning-trained classifier that can detect objects in a path and surrounding environment of the autonomous vehicle based on the first number of chirps in the first RF signal and classify the objects based on the second number of chirps in the second RF signal.

20 Claims, 13 Drawing Sheets

| $R_{max}$ | $v_{max}$ | | $\Delta R$ | $N_r$ | $\Delta v$ | $N_c$ | $T_{tot}$ | B | $T_{chirp}$ | $T_{repeat}$ |
|---|---|---|---|---|---|---|---|---|---|---|
| [m] | [m/s] | [km/h] | [m] | | [m/s] | | [ms] | [MHz] | [µs] | [µs] |
| 330 | 30 | 108 | 1.3 | 512 | 0.5 | 128 | 4.2 | 162 | 28.48 | 32.85 |
| 330 | 30 | 108 | 2.6 | 256 | 1 | 64 | 2.1 | 104 | 18.24 | 32.86 |

FIG. 8B

BEAM STEERING RADAR WITH ADJUSTABLE LONG-RANGE RADAR MODE FOR AUTONOMOUS VEHICLES

CROSS REFERENCE TO RELATED APPLICATIONS

This application claims priority to U.S. Prov. Appl. No. 62/869,899, titled "BEAM STEERING RADAR WITH AN ADJUSTABLE LONG RANGE MODE FOR USE IN AUTONOMOUS VEHICLES," filed on Jul. 2, 2019, which is incorporated by reference herein in its entirety.

BACKGROUND

Autonomous driving is quickly moving from the realm of science fiction to becoming an achievable reality. Already in the market are Advanced-Driver Assistance Systems ("ADAS") that automate, adapt and enhance vehicles for safety and better driving. The next step will be vehicles that increasingly assume control of driving functions such as steering, accelerating, braking and monitoring the surrounding environment and driving conditions to respond to events, such as changing lanes or speed when needed to avoid traffic, crossing pedestrians, animals, and so on. The requirements for object and image detection are critical and specify the time required to capture data, process it and turn it into action. All this while ensuring accuracy, consistency and cost optimization.

An aspect of making this work is the ability to detect and classify objects in the surrounding environment at the same or possibly even better level as humans. Humans are adept at recognizing and perceiving the world around them with an extremely complex human visual system that essentially has two main functional parts: the eye and the brain. In autonomous driving technologies, the eye may include a combination of multiple sensors, such as camera, radar, and lidar, while the brain may involve multiple artificial intelligence, machine learning and deep learning systems. The goal is to have full understanding of a dynamic, fast-moving environment in real time and human-like intelligence to act in response to changes in the environment.

BRIEF DESCRIPTION OF THE DRAWINGS

The present application may be more fully appreciated in connection with the following detailed description taken in conjunction with the accompanying drawings, which are not drawn to scale and in which like reference characters refer to like parts throughout, and wherein:

FIGS. 8A-B illustrate example scan parameters to generate the radar beam of FIGS. 7A-B in accordance with various examples;

DETAILED DESCRIPTION

A beam steering radar with an adjustable long-range mode for use in autonomous vehicles is disclosed. The beam steering radar incorporates at least one beam steering antenna that is dynamically controlled such as to change its electrical or electromagnetic configuration to enable beam steering. In various examples, the beam steering radar operates as a long-range radar ("LRR") to enable a narrow, directed beam at a long distance and having high gain for a high-speed operation to detect objects. Once the objects are detected, the radar adjusts its LRR mode to increase the number of chirps in the radar signal and improve the velocity estimation for the detected objects. The dynamic control is implemented with processing engines which, upon identifying objects in the vehicle's field-of-view (FoV), informs the beam steering radar where to steer its beams and focus on areas and objects of interest by adjusting its radar scan parameters. The objects of interest may include structural elements in the vehicle's FoV such as roads, walls, buildings and road center medians, as well as other vehicles, pedestrians, bystanders, cyclists, plants, trees, animals and so on.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, the subject technology is not limited to the specific details set forth herein and may be practiced using one or more implementations. In one or more instances, structures and components are shown in block diagram form in order to avoid obscuring the concepts of the subject technology. In other instances, well-known methods and structures may not be described in detail to avoid unnecessarily obscuring the description of the examples. Also, the examples may be used in combination with each other.

Figure 1:
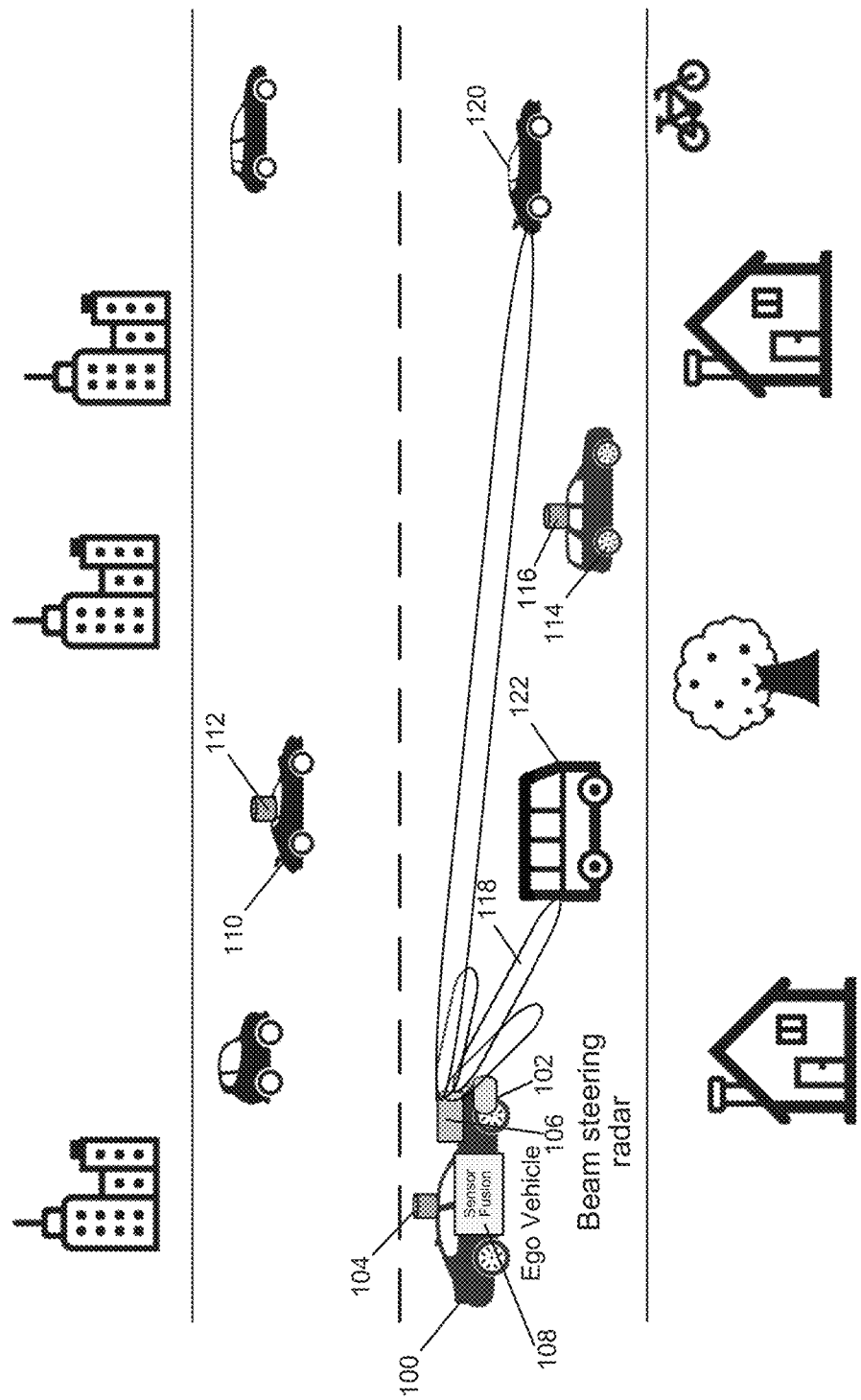
FIG. 1 illustrates an example environment in which a beam steering radar with an adjustable long-range mode in an autonomous vehicle is used to detect and identify objects.

FIG. 1 illustrates an example environment in which a beam steering radar with an adjustable long-range mode in an autonomous vehicle is used to detect and identify objects. Ego vehicle 100 is an autonomous vehicle with a beam steering radar system 106 for transmitting a radar signal to scan a FoV or specific area. As described in more detail below, the radar signal is transmitted according to a set of scan parameters that can be adjusted to result in multiple transmission beams 118. The scan parameters may include, among others, the total angle of the scanned area defining the FoV, the beam width or the scan angle of each incremental transmission beam, the number of chirps in the radar signal, the chirp time, the chirp segment time, the chirp slope, and so on. The entire FoV or a portion of it can be scanned by a compilation of such transmission beams 118, which may be in successive adjacent scan positions or in a specific or random order. Note that the term FoV is used herein in reference to the radar transmissions and does not imply an optical FoV with unobstructed views. The scan parameters may also indicate the time interval between these incremental transmission beams, as well as start and stop angle positions for a full or partial scan.

In various examples, the ego vehicle 100 may also have other perception sensors, such as camera 102 and lidar 104. These perception sensors are not required for the ego vehicle 100, but may be useful in augmenting the object detection capabilities of the beam steering radar 106. Camera sensor 102 may be used to detect visible objects and conditions and to assist in the performance of various functions. The lidar sensor 104 can also be used to detect objects and provide this information to adjust control of the vehicle. This information may include information such as congestion on a highway, road conditions, and other conditions that would impact the sensors, actions or operations of the vehicle. Camera sensors are currently used in Advanced Driver Assistance Systems ("ADAS") to assist drivers in driving functions such as parking (e.g., in rear view cameras). Cameras can capture texture, color and contrast information at a high level of detail, but similar to the human eye, they are susceptible to adverse weather conditions and variations in lighting. Camera 102 may have a high resolution but cannot resolve objects beyond 50 meters.

Lidar sensors typically measure the distance to an object by calculating the time taken by a pulse of light to travel to an object and back to the sensor. When positioned on top of a vehicle, a lidar sensor can provide a 360° 3D view of the surrounding environment. Other approaches may use several lidars at different locations around the vehicle to provide the full 360° view. However, lidar sensors such as lidar 104 are still prohibitively expensive, bulky in size, sensitive to weather conditions and are limited to short ranges (typically <150-200 meters). Radars, on the other hand, have been used in vehicles for many years and operate in all-weather conditions. Radars also use far less processing than the other types of sensors and have the advantage of detecting objects behind obstacles and determining the speed of moving objects. When it comes to resolution, lidars' laser beams are focused on small areas, have a smaller wavelength than RF signals, and can achieve around 0.25 degrees of resolution.

In various examples and as described in more detail below, the beam steering radar 106 can provide a 360° true 3D vision and human-like interpretation of the ego vehicle's path and surrounding environment. The beam steering radar 106 can shape and steer RF beams in all directions in a 360° FoV with at least one beam steering antenna and recognize objects quickly and with a high degree of accuracy over a long range of around 300 meters or more. The short-range capabilities of camera 102 and lidar 104 along with the long-range capabilities of radar 106 enable a sensor fusion module 108 in ego vehicle 100 to enhance its object detection and identification.

As illustrated, beam steering radar 106 can detect both vehicle 120 at a far range (e.g., >250 m) as well as bus 122 at a short range (e.g., <100 m). Detecting both in a short amount of time and with enough range and velocity resolution is imperative for full autonomy of driving functions of the ego vehicle. Radar 106 has an adjustable LRR mode that enables the detection of long-range objects in a very short time to then focus on obtaining finer velocity resolution for the detected vehicles. Although not described herein, radar 106 is capable of time-alternatively reconfiguring between LRR and short-range radar ("SRR") modes. The SRR mode enables a wide beam with lower gain, but can make quick decisions to avoid an accident, assist in parking and downtown travel, and capture information about a broad area of the environment. The LRR mode enables a narrow, directed beam and long distance, having high gain; this is powerful for high speed applications, and where longer processing time allows for greater reliability. The adjustable LRR mode disclosed herein uses a reduced number of chirps (e.g., 5, 10, 15, or 20) to reduce the chirp segment time by up to 75%, guaranteeing a fast beam scanning rate that is critical for successful object detection and autonomous vehicle performance. Excessive dwell time for each beam position may cause blind zones, and the adjustable LRR mode ensures that fast object detection can occur at long range while maintaining the antenna gain, transmit power and desired SNR for the radar operation.

Figure 2:
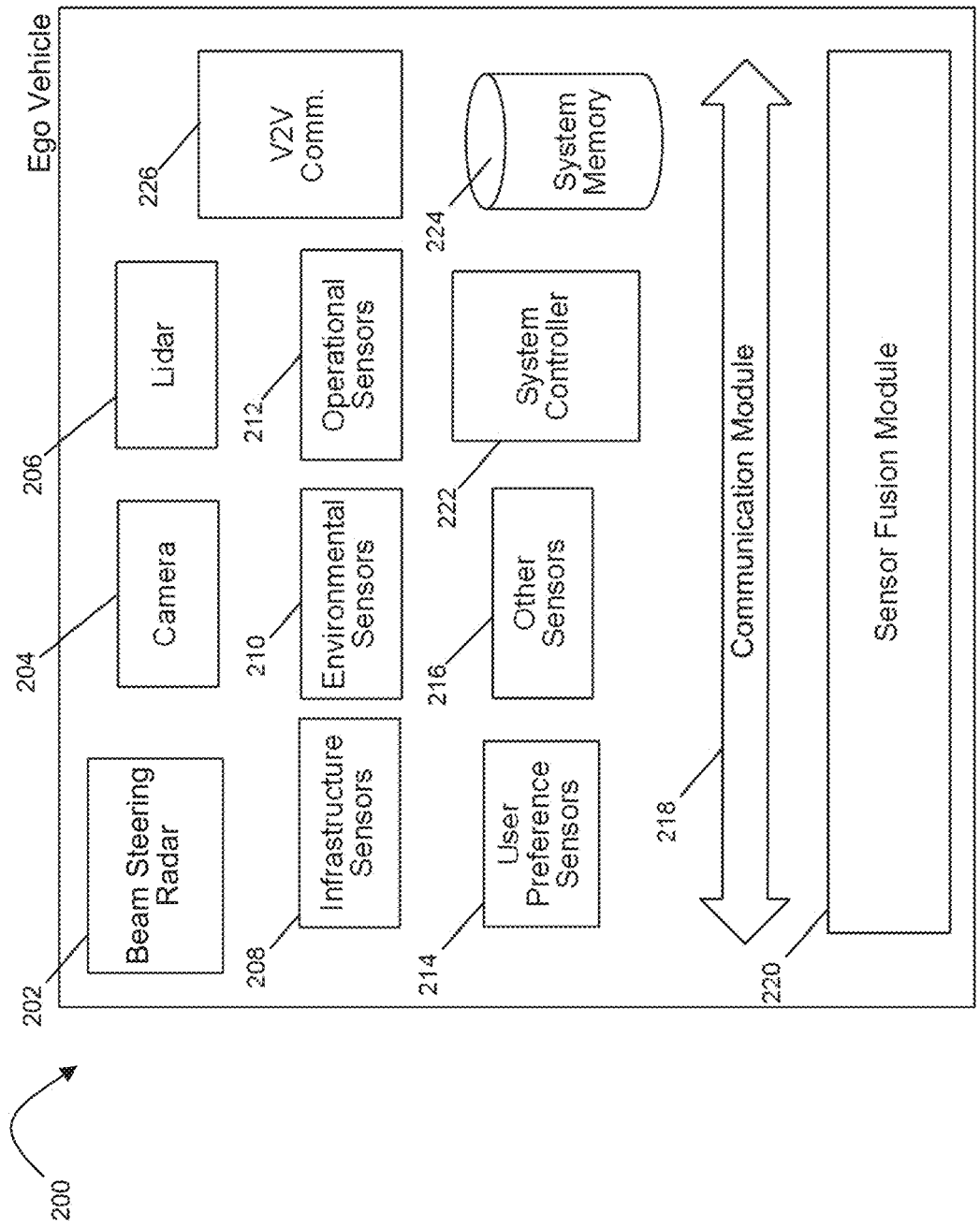
FIG. 2 is a schematic diagram of an autonomous driving system for an autonomous vehicle in accordance with various examples.

Attention is now directed to FIG. 2, which illustrates a schematic diagram of an autonomous driving system for an ego vehicle in accordance with various examples. Autonomous driving system 200 is a system for use in an ego vehicle that provides some or full automation of driving functions. The driving functions may include, for example, steering, accelerating, braking, and monitoring the surrounding environment and driving conditions to respond to events, such as changing lanes or speed when needed to avoid traffic, crossing pedestrians, animals, and so on. The autonomous driving system 200 includes a beam steering radar system 202 and other sensor systems such as camera 204, lidar 206, infrastructure sensors 208, environmental sensors 210, operational sensors 212, user preference sensors 214, and other sensors 216. Autonomous driving system 200 also includes a communications module 218, a sensor fusion module 220, a system controller 222, a system memory 224, and a vehicle-to-vehicle (V2V) communications module 226. It is appreciated that this configuration of autonomous driving system 200 is an example configuration and not meant to be limiting to the specific structure illustrated in FIG. 2. Additional systems and modules not shown in FIG. 2 may be included in autonomous driving system 200.

In various examples, beam steering radar 202 with adjustable LRR mode includes at least one beam steering antenna for providing dynamically controllable and steerable beams that can focus on one or multiple portions of a 360° FoV of the vehicle. The beams radiated from the beam steering antenna are reflected back from objects in the vehicle's path and surrounding environment and received and processed by the radar 202 to detect and identify the objects. Radar 202 includes a perception module that is trained to detect and identify objects and control the radar module as desired. Camera sensor 204 and lidar 206 may also be used to identify objects in the path and surrounding environment of the ego vehicle, albeit at a much lower range.

Infrastructure sensors 208 may provide information from infrastructure while driving, such as from a smart road configuration, bill board information, traffic alerts and indicators, including traffic lights, stop signs, traffic warnings, and so forth. This is a growing area, and the uses and capabilities derived from this information are immense. Environmental sensors 210 detect various conditions outside, such as temperature, humidity, fog, visibility, precipitation, among others. Operational sensors 212 provide information about the functional operation of the vehicle. This may be tire pressure, fuel levels, brake wear, and so forth.

The user preference sensors 214 may be configured to detect conditions that are part of a user preference. This may be temperature adjustments, smart window shading, etc. Other sensors 216 may include additional sensors for monitoring conditions in and around the vehicle.

In various examples, the sensor fusion module 220 optimizes these various functions to provide an approximately comprehensive view of the vehicle and environments. Many types of sensors may be controlled by the sensor fusion module 220. These sensors may coordinate with each other to share information and consider the impact of one control action on another system. In one example, in a congested driving condition, a noise detection module (not shown) may identify that there are multiple radar signals that may interfere with the vehicle. This information may be used by a perception module in radar 202 to adjust the radar's scan parameters so as to avoid these other signals and minimize interference.

In another example, environmental sensor 210 may detect that the weather is changing, and visibility is decreasing. In this situation, the sensor fusion module 220 may determine to configure the other sensors to improve the ability of the vehicle to navigate in these new conditions. The configuration may include turning off camera or lidar sensors 204-206 or reducing the sampling rate of these visibility-based sensors. This effectively places reliance on the sensor(s) adapted for the current situation. In response, the perception module configures the radar 202 for these conditions as well. For example, the radar 202 may reduce the beam width to provide a more focused beam, and thus a finer sensing capability.

In various examples, the sensor fusion module 220 may send a direct control to radar 202 based on historical conditions and controls. The sensor fusion module 220 may also use some of the sensors within system 200 to act as feedback or calibration for the other sensors. In this way, an operational sensor 212 may provide feedback to the perception module and/or the sensor fusion module 220 to create templates, patterns and control scenarios. These are based on successful actions or may be based on poor results, where the sensor fusion module 220 learns from past actions.

Data from sensors 202-216 may be combined in sensor fusion module 220 to improve the target detection and identification performance of autonomous driving system 200. Sensor fusion module 220 may itself be controlled by system controller 222, which may also interact with and control other modules and systems in the vehicle. For example, system controller 222 may turn the different sensors 202-216 on and off as desired, or provide instructions to the vehicle to stop upon identifying a driving hazard (e.g., deer, pedestrian, cyclist, or another vehicle suddenly appearing in the vehicle's path, flying debris, etc.).

All modules and systems in autonomous driving system 200 communicate with each other through communication module 218. Autonomous driving system 200 also includes system memory 224, which may store information and data (e.g., static and dynamic data) used for operation of system 200 and the ego vehicle using system 200. V2V communications module 226 is used for communication with other vehicles. The V2V communications may also include information from other vehicles that is invisible to the user, driver, or rider of the vehicle, and may help vehicles coordinate to avoid an accident.

Figure 3:
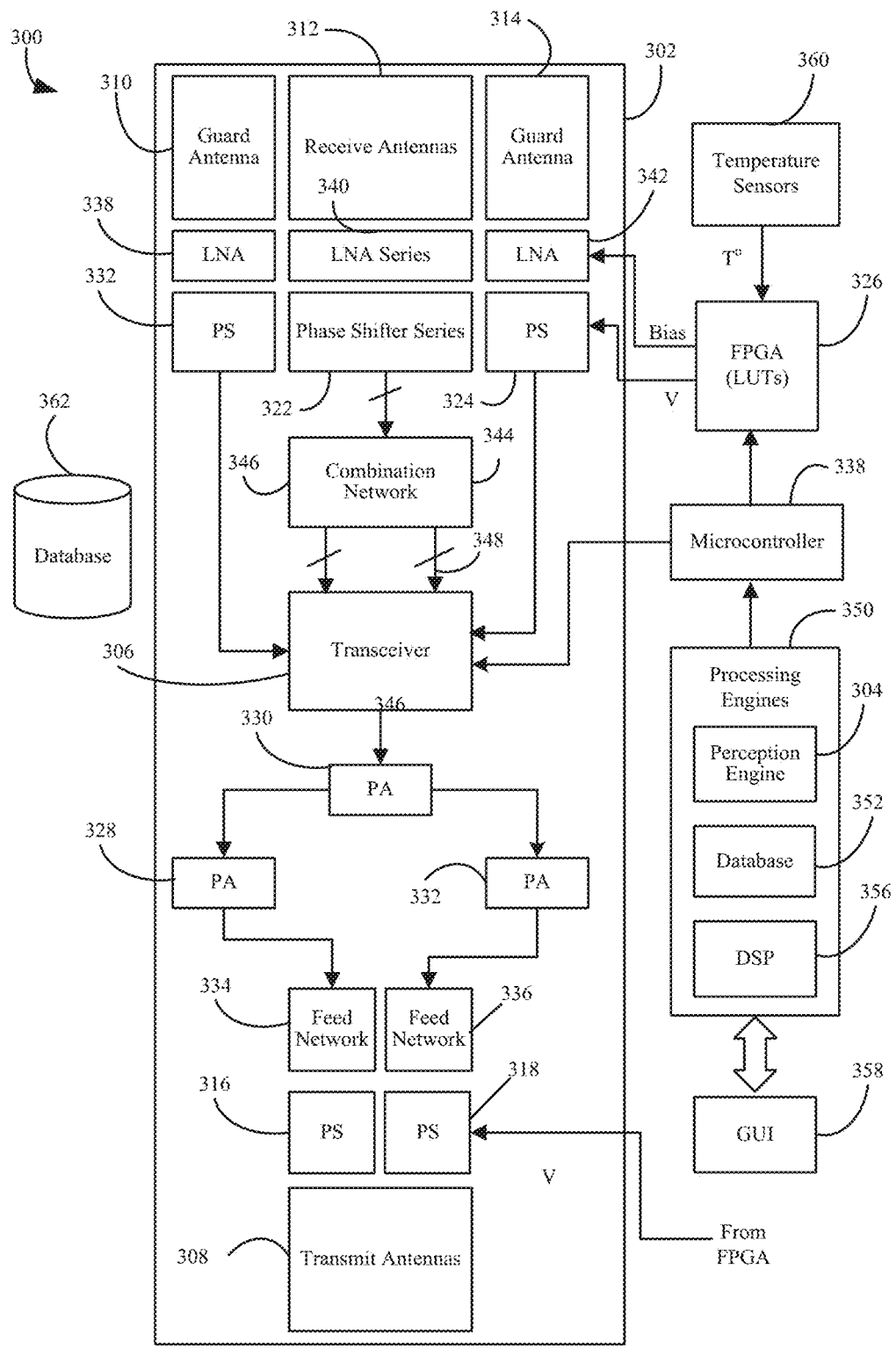
FIG. 3 is a schematic diagram of a beam steering radar system as in FIG. 2 in accordance with various examples.

FIG. 3 illustrates a schematic diagram of a beam steering radar system with adjustable LRR mode as in FIG. 2 in accordance with various examples. Beam steering radar 300 is a "digital eye" with true 3D vision and capable of a human-like interpretation of the world. The "digital eye" and human-like interpretation capabilities are provided by two main modules: radar module 302 and a perception engine 304. Radar module 302 is capable of both transmitting RF signals within a FoV and receiving the reflections of the transmitted signals as they reflect off of objects in the FoV. With the use of analog beamforming in radar module 302, a single transmit and receive chain can be used effectively to form a directional, as well as a steerable, beam. A transceiver 306 in radar module 302 is adapted to generate signals for transmission through a series of transmit antennas 308 as well as manage signals received through a series of receive antennas 310-314. Beam steering within the FoV is implemented with phase shifter ("PS") circuits 316-318 coupled to the transmit antennas 308 on the transmit chain and PS circuits 320-324 coupled to the receive antennas 310-314 on the receive chain, respectively.

The use of PS circuits 316-318 and 320-324 enables separate control of the phase of each element in the transmit and receive antennas. Unlike early passive architectures, the beam is steerable not only to discrete angles but to any angle (i.e., from 0° to 360°) within the FoV using active beamforming antennas. A multiple element antenna can be used with an analog beamforming architecture where the individual antenna elements may be combined or divided at the port of the single transmit or receive chain without additional hardware components or individual digital processing for each antenna element. Further, the flexibility of multiple element antennas allows narrow beam width for transmit and receive. The antenna beam width decreases with an increase in the number of antenna elements. A narrow beam improves the directivity of the antenna and provides the radar 300 with a significantly longer detection range.

The major challenge with implementing analog beam steering is to design PSs to operate at 77 GHz. PS circuits 316-318 and 320-324 solve this problem with a reflective PS design implemented with a distributed varactor network currently built using GaAs materials. Each PS circuit 316-318 and 320-324 has a series of PSs, with each PS coupled to an antenna element to generate a phase shift value of anywhere from 0° to 360° for signals transmitted or received by the antenna element. The PS design is scalable in future implementations to SiGe and CMOS, bringing down the PS cost to meet specific demands of customer applications. Each PS circuit 316-318 and 320-324 is controlled by a Field Programmable Gate Array ("FPGA") 326, which provides a series of voltages to the PSs in each PS circuit that results in a series of phase shifts.

In various examples, a voltage value is applied to each PS in the PS circuits 316-318 and 320-324 to generate a given phase shift and provide beam steering. The voltages applied to the PSs in PS circuits 316-318 and 320-324 are stored in Look-up Tables ("LUTs") in the FPGA 306. These LUTs are generated by an antenna calibration process that determines which voltages to apply to each PS to generate a given phase shift under each operating condition. Note that the PSs in PS circuits 316-318 and 320-324 are capable of generating phase shifts at a very high resolution of less than one degree. This enhanced control over the phase allows the transmit and receive antennas in radar module 302 to steer beams with a very small step size, improving the capability of the radar 300 to resolve closely located targets at small angular resolution.

In various examples, the transmit antennas 308 and the receive antennas 310-314 may be a meta-structure antenna, a phase array antenna, or any other antenna capable of radiating RF signals in millimeter wave frequencies. A meta-structure, as generally defined herein, is an engineered structure capable of controlling and manipulating incident radiation at a desired direction based on its geometry. Various configurations, shapes, designs and dimensions of the antennas 308-314 may be used to implement specific designs and meet specific constraints.

The transmit chain in radar 300 starts with the transceiver 306 generating RF signals to prepare for transmission over-the-air by the transmit antennas 308. The RF signals may be, for example, Frequency-Modulated Continuous Wave ("FMCW") signals. An FMCW signal enables the radar 300 to determine both the range to an object and the object's velocity by measuring the differences in phase or frequency between the transmitted signals and the received/reflected signals or echoes. Within FMCW formats, there are a variety of waveform patterns that may be used, including sinusoidal, triangular, sawtooth, rectangular and so forth, each having advantages and purposes.

Once the FMCW signals are generated by the transceiver 306, they are provided to power amplifiers ("PAs") 328-332. Signal amplification is needed for the FMCW signals to reach the long ranges desired for object detection, as the signals attenuate as they radiate by the transmit antennas 308. From the PAs 328-332, the signals are divided and distributed through feed networks 334-336, which form a power divider system to divide an input signal into multiple signals, one for each element of the transmit antennas 308. The feed networks 334-336 may divide the signals so power is equally distributed among them or alternatively, so power is distributed according to another scheme, in which the divided signals do not all receive the same power. Each signal from the feed networks 334-336 is then input into a PS in PS circuits 316-318, where they are phase shifted based on voltages generated by the FPGA 326 under the direction of microcontroller 338 and then transmitted through transmit antennas 308.

Microcontroller 338 determines which phase shifts to apply to the PSs in PS circuits 316-318 according to a desired scanning mode based on road and environmental scenarios. Microcontroller 338 also determines the scan parameters for the transceiver to apply at its next scan. The scan parameters may be determined at the direction of one of the processing engines 350, such as at the direction of perception engine 304. Depending on the objects detected, the perception engine 304 may instruct the microcontroller 338 to adjust the scan parameters at a next scan to focus on a given area of the FoV or to steer at a different direction.

In various examples and as described in more detail below, radar 300 operates in a LRR mode to enable a narrow, directed beam at a long distance and having high gain for a high-speed operation to detect objects with a reduced number of chirps. In this mode, both transmit antennas 308 and receive antennas 310-314 scan a complete FoV with small incremental steps. Even though the FoV may be limited by system parameters due to increased side lobes as a function of the steering angle, radar 300 can detect objects over a significant area for a long-range radar. The range of angles to be scanned on either side of boresight as well as the step size between steering angles/phase shifts can be dynamically varied based on the driving environment.

To improve performance of an autonomous vehicle, such as an ego vehicle, driving through an urban environment, the scan range can be increased to keep monitoring the intersections and curbs to detect vehicles, pedestrians, bicyclists and so on. This wide scan range may deteriorate the frame rate (revisit rate), but this is acceptable as urban environments may generally involve low velocity driving scenarios.

For a high-speed freeway scenario where the frame rate is critical, a higher frame rate can be maintained by reducing the scan range. On a freeway, a few degrees of beam scanning on either side of boresight would suffice for a long-range object detection and tracking. Once objects are detected at long range, radar 300 increases the number of chirps in the radar signal and improves the velocity estimation for the detected objects.

Objects are detected with radar 300 by reflections or echoes that are received at the series of receive antennas 310-314, which are directed by PS circuits 320-324. Low Noise Amplifiers ("LNAs") are positioned between receive antennas 310-314 and PS circuits 320-324, which include PSs similar to the PSs in PS circuits 316-318. For receive operation, PS circuits 310-324 create phase differentials between radiating elements in the receive antennas 310-314 to compensate for the time delay of received signals between radiating elements due to spatial configurations. Receive phase-shifting, also referred to as analog beamforming, combines the received signals for aligning echoes to identify the location, or position of a detected object. That is, phase shifting aligns the received signals that arrive at different times at each of the radiating elements in receive antennas 310-314. Similar to PS circuits 316-318 on the transmit chain, PS circuits 320-324 are controlled by FPGA 326, which provides the voltages to each PS to generate the desired phase shift. FPGA 326 also provides bias voltages to the LNAs 338-342.

The receive chain then combines the signals received at receive antennas 312 at combination network 344, from which the combined signals propagate to the transceiver 306. Note that as illustrated, combination network 344 generates two combined signals 346-348, with each signal combining signals from a number of elements in the receive antennas 312. In one example, receive antennas 312 include 48 radiating elements and each combined signal 346-348 combines signals received by 24 of the 48 elements. Other examples may include 8, 16, 24, 32, and soon, depending on the desired configuration. The higher the number of antenna elements, the narrower the beam width.

Note also that the signals received at receive antennas 310 and 314 go directly from PS circuits 320 and 324 to the transceiver 306. Receive antennas 310 and 314 are guard antennas that generate a radiation pattern separate from the main beams received by the 48-element receive antenna 312. Guard antennas 310 and 314 are implemented to effectively eliminate side-lobe returns from objects. The goal is for the guard antennas 310 and 314 to provide a gain that is higher than the side lobes and therefore enable their elimination or reduce their presence significantly. Guard antennas 310 and 314 effectively act as a side lobe filter.

Once the received signals are received by transceiver 306, they are processed by processing engines 350. Processing engines 350 include perception engine 304 which detects and identifies objects in the received signal with neural network and artificial intelligence techniques, database 352 to store historical and other information for radar 300, and a Digital Signal Processing ("DSP") engine 354 with an Analog-to-Digital Converter ("ADC") module to convert the analog signals from transceiver 306 into digital signals that can be processed to determine angles of arrival and other valuable information for the detection and identification of objects by perception engine 304. In one or more implementations, DSP engine 354 may be integrated with the microcontroller 338 or the transceiver 306.

Radar 300 also includes a Graphical User Interface ("GUI") 358 to enable configuration of scan parameters such as the total angle of the scanned area defining the FoV, the beam width or the scan angle of each incremental transmission beam, the number of chirps in the radar signal, the chirp time, the chirp slope, the chirp segment time, and so on as desired. In addition, radar 300 has a temperature sensor 360 for sensing the temperature around the vehicle so that the proper voltages from FPGA 326 may be used to generate the desired phase shifts. The voltages stored in FPGA 326 are determined during calibration of the antennas under different operating conditions, including temperature conditions. A database 362 may also be used in radar 300 to store radar and other useful data.

Figure 4:
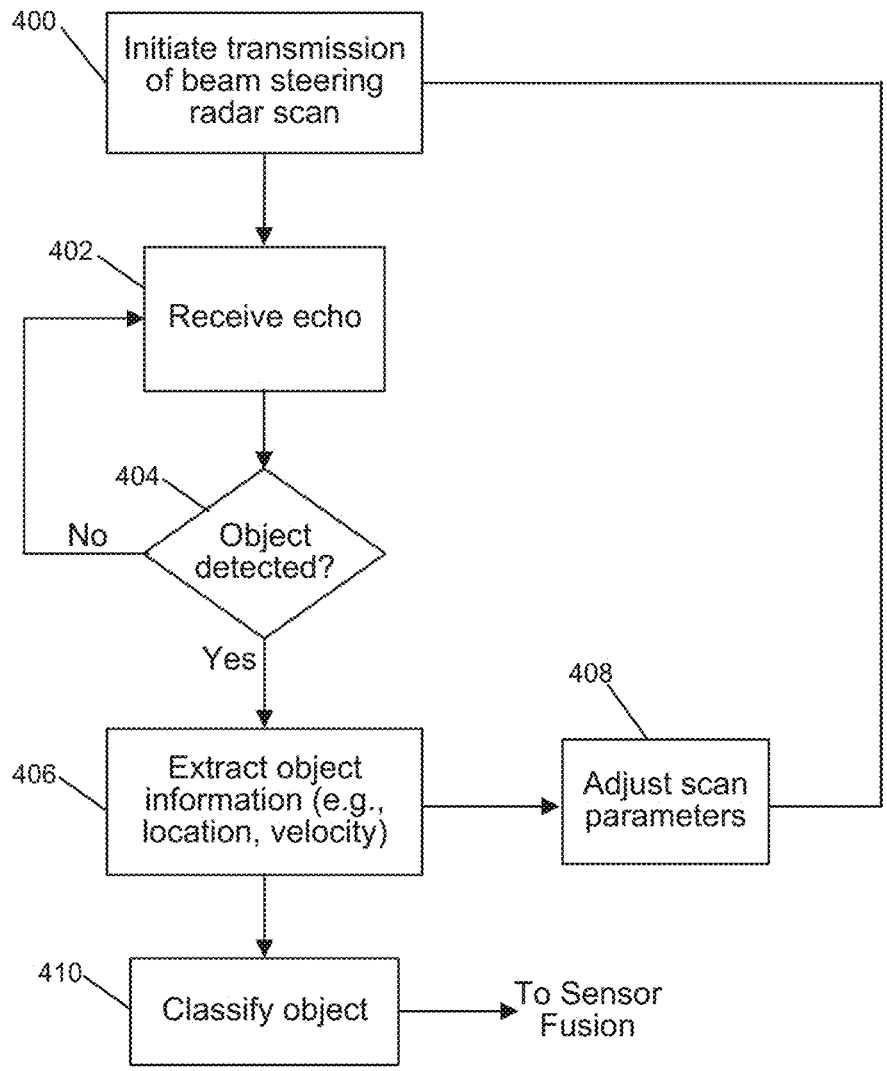
FIG. 4 illustrates the antenna elements of the receive and guard antennas of FIG. 3 in more detail in accordance with various examples.

Attention is now directed to FIG. 4, which shows the antenna elements of the receive and guard antennas of FIG. 3 in more detail. Receive antenna 400 has a number of radiating elements 402 creating receive paths for signals or reflections from an object at a slightly different time. In various implementations, the radiating elements 402 are meta-structures or patches in an array configuration such as in a 48-element antenna. The phase and amplification modules 404 provide phase shifting to align the signals in time. The radiating elements 402 are coupled to the combination structure 406 and to phase and amplification modules 404, including phase shifters and LNAs implemented as PS circuits 320-324 and LNAs 338-342 of FIG. 3. In the present illustration, two objects, object A 408 and object B 410, are located at a same range and having a same velocity with respect to the antenna 400. When the distance between the objects is less than the bandwidth of a radiation beam, the objects may be indistinguishable by the system. This is referred to as angular resolution or spatial resolution. In the radar and object detection fields, the angular resolution describes the radar's ability to distinguish between objects positioned proximate each other, wherein proximate location is generally measured by the range from an object detection mechanism, such as a radar antenna, to the objects and the velocity of the objects.

Radar angular resolution is the minimum distance between two equally large targets at the same range which the radar can distinguish and separate. The angular resolution is a function of the antenna's half-power beam width, referred to as the 3 dB beam width and serves as limiting factor to object differentiation. Distinguishing objects is based on accurately identifying the angle of arrival of reflections from the objects. Smaller beam width angles result in high directivity and more refined angular resolution but requires faster scanning to achieve the smaller step sizes. For example, in autonomous vehicle applications, the radar is tasked with scanning an environment of the vehicle within a sufficient time period for the vehicle to take corrective action when needed. This limits the capability of a system to specific steps. This means that any object having a distance therebetween less than the 3 dB angle beam width cannot be distinguished without additional processing. Put another way, two identical targets at the same distance are resolved in angle if they are separated by more than the antenna 3 dB beam width. The present examples use the multiple guard band antennas to distinguish between the objects.

Figure 5:
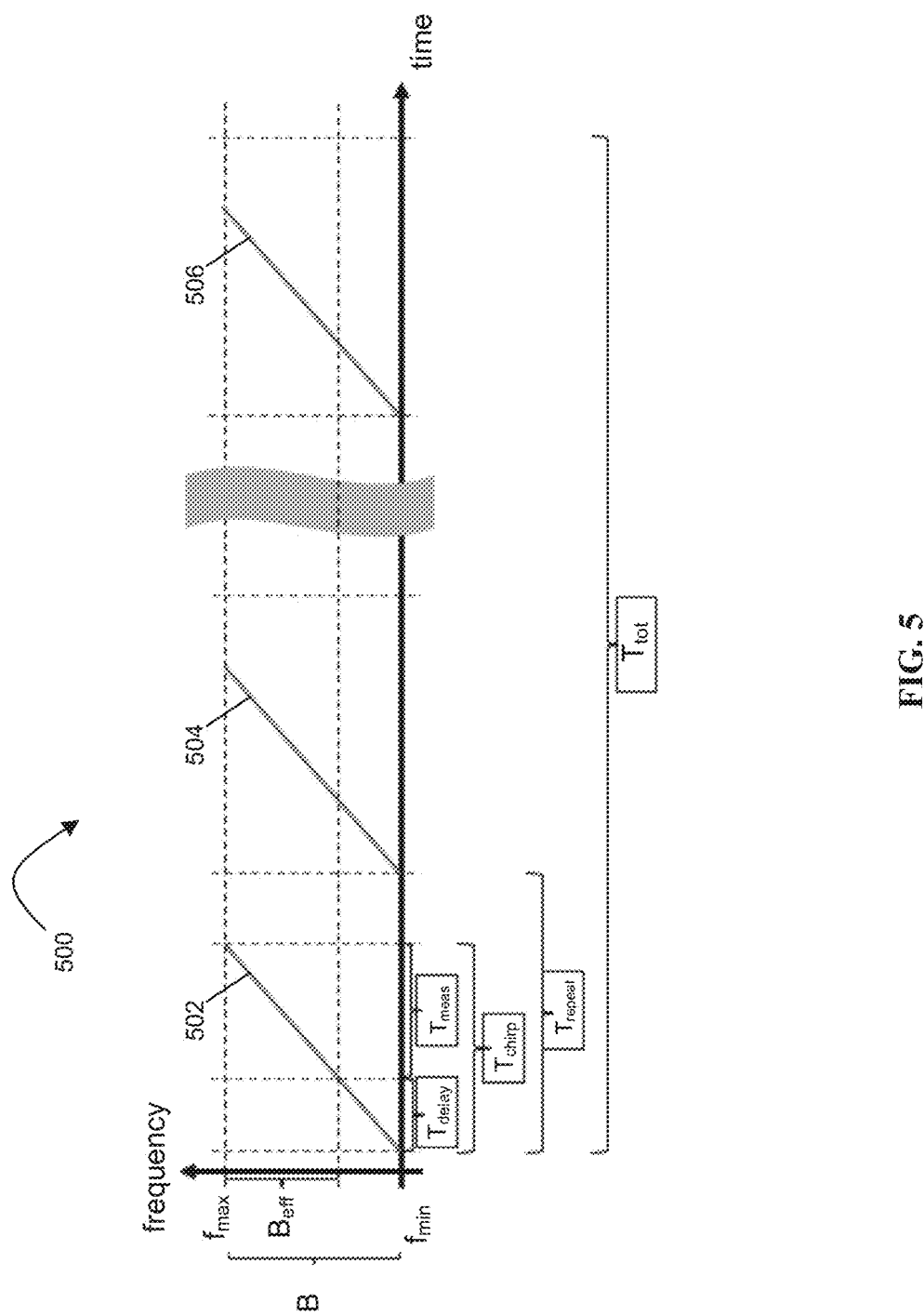
FIG. 5 illustrates an example radar signal and its associated scan parameters in more detail.

FIG. 5 illustrates a radar signal and its associated scan parameters in more detail. Radar signal 500 is an FMCW signal containing a series of chirps, such as chirps 502-506. Signal 500 is defined by a set of parameters that impact how to determine an object's location, its resolution, and velocity. The parameters associated with the signal 500 and illustrated in FIG. 5 include the following: (1) $f_{max}$ and $f_{min}$ for the minimum and maximum frequency of the chirp signal; (2) $T_{total}$ for the total time for one chirp sequence; (3) $T_{delay}$ representing the settling time for a Phase Locked Loop ("PLL") in the radar system; (4) $T_{meas}$ for the actual measurement time (e.g., >2 s for a chirp sequence to detect objects within 300 meters); (5) $T_{chip}$ for the total time of one chirp; (6) B for the total bandwidth of the chirp; (7) $B_{eff}$ for the effective bandwidth of the chirp; (8) $\Delta B_{eff}$ for the bandwidth between consecutive measurements; (9) $N_r$ for the number of measurements taken per chirp (i.e., for each chirp, how many measurements will be taken of echoes); and (10) $N_c$, the number of chirps.

The distance and distance resolution of an object are fully determined by the chirp parameters $N_r$ and $B_{eff}$. In some aspects, the range resolution can be expressed as follows:

$$\Delta R = \frac{c}{2B_{eff}} \propto \frac{1}{B_{eff}} \tag{Eq. 1}$$

In some aspects, the maximum distance (or range) can be expressed as follows:

$$R_{max} = \frac{c}{4B_{eff}} N_r \propto \frac{1}{\Delta B_{eff}} \tag{Eq. 2}$$

The velocity and velocity resolution of an object are fully determined by chirp sequence parameters ($N_c$, $T_{chirp}$) and frequency ($f_{min}$). The minimum velocity (or velocity resolution) achieved is determined as follows (with c denoting the speed of light):

$$v_{min} = \Delta v = \frac{c}{2f_c} \frac{1}{N_S T_{chirp}} \propto \frac{1}{T_{tot}} \tag{Eq. 3}$$

Note that higher radar frequencies result in a better velocity resolution for the same sequence parameters. The maximum velocity is given by:

$$v_{max} = \frac{c}{4f_c} \frac{1}{T_{chirp}} \propto \frac{1}{T_{chirp}} \propto \frac{\Delta R}{R_{max}} \tag{Eq. 4}$$

Additional relationships between the scan parameters are given by the following equations, with Eq. 5 denoting the chirp slope $\kappa_{chirp}$, and Eq. 6 denoting the sample frequency:

$$\kappa_{chirp} = \frac{B_{eff}}{T_{chirp}} \tag{Eq. 5}$$

$$f_{sample} \propto \kappa_{chirp} * R_{max} \tag{Eq. 6}$$

In various aspects, the sample frequency is fixed. Also, the sample rate $f_{sample}$ in Eq. 6 determines how fine a range resolution can be achieved for a selected maximum velocity and selected maximum range. In some aspects, the maximum range $R_{max}$ may be defined by a user configuration depending on the type of environment (or type of path) detected. Note that once the maximum range $R_{max}$ is fixed, $v_{max}$ and $\Delta R$ are no longer independent. One chirp sequence or segment has multiple chirps. Each chirp is sampled multiple times to give multiple range measurements and measure doppler velocity accurately. Each chirp may be defined by its slope, $\kappa_{chirp}$. The maximum range requirement may be inversely proportional to effective bandwidth of the chirp $B_{eff}$ as indicated in Eq. 1, where an increase in the $B_{eff}$ parameter can achieve an improved range resolution (or decreased range resolution value). The decreased range resolution value may be useful for object classification in a city street environment, where objects are moving at a significantly lower velocity compared to the highway environment so an improvement in the range resolution parameter value bears more weight than observing a degradation in the maximum velocity parameter. Similarly, the maximum velocity capability of a radar may be inversely proportional to the chirp time $T_{chirp}$ as indicated in Eq. 4, where a decrease in the $T_{chirp}$ parameter can achieve an improved maximum velocity (or increased maximum velocity value). The increased maximum velocity may be useful for object detection in a highway environment, where objects are moving at a significantly higher velocity compared to the city street environment so an improvement in the maximum velocity parameter bears more weight than observing a degradation in the range resolution parameter.

Note also that Eqs. 1-6 above can be used to establish scan parameters for given design goals. For example, to detect objects at high resolution at long ranges, the radar system 300 needs to take a large number of measurements per chirp. If the goal is to detect objects at high speed at a long range, the chirp time has to be low, limiting the chirp time. In the first case, high resolution detection at long range is limited by the bandwidth of the signal processing unit in the radar system. And in the second case, high maximum velocity at long range is limited by the data acquisition speed of the radar chipset (which also limits resolution).

Figure 6:
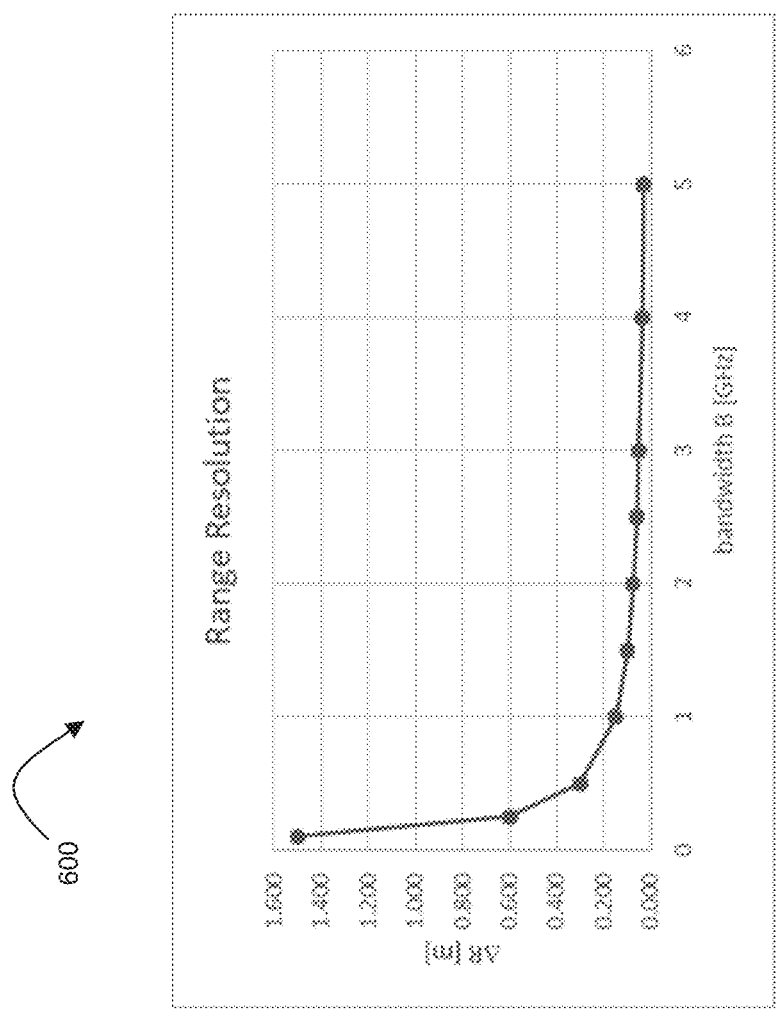
FIG. 6 is a flowchart for operating a beam steering radar in an adjustable long-range mode in accordance with various examples.

Accordingly, in a LRR mode, the radar can start with a low number of chirps to detect objects at long range in an initial scan. Once the objects are detected, the radar adjusts its LRR mode to increase the number of chirps in the radar signal and improve the velocity estimation for the detected objects. FIG. 6 illustrates this process. First, the radar initiates transmission of a scan in LRR mode with a reduced number of chirps (600). The number of chirps may be, in some examples, as low as 5 chirps. Once an echo is received (602) and objects are detected (604), the radar then rescans the FoV with a higher number of chirps to focus beams at the range bins where the objects were detected (606). This enables the radar to extract both range and velocity for all objects detected at long range (608) so that the objects can then be classified by the perception engine 304 of FIG. 3 into the different types of objects such as vehicles, cyclists, pedestrians, infrastructure objects, animals, and so forth. The object classification is then sent to a sensor fusion module, where it is analyzed together with object detection information from other sensors such as lidar and camera sensors.

Figure 7A:
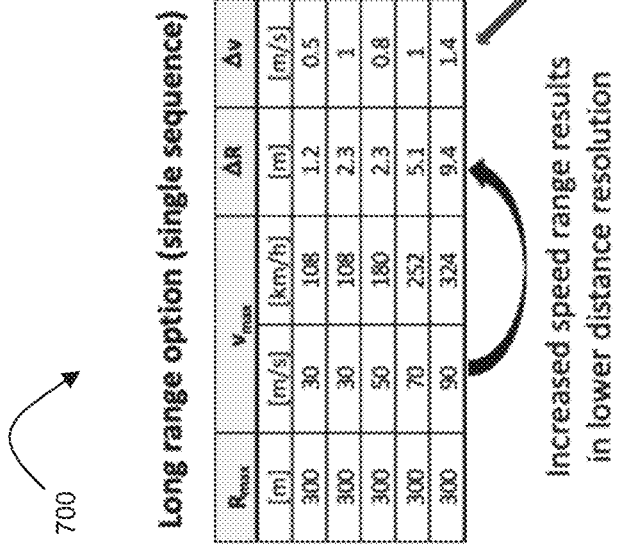
FIGS. 7A-B illustrate an example radar beam transmitted by a beam steering radar implemented as in FIG. 3 and in accordance with various examples.
Figure 7B:
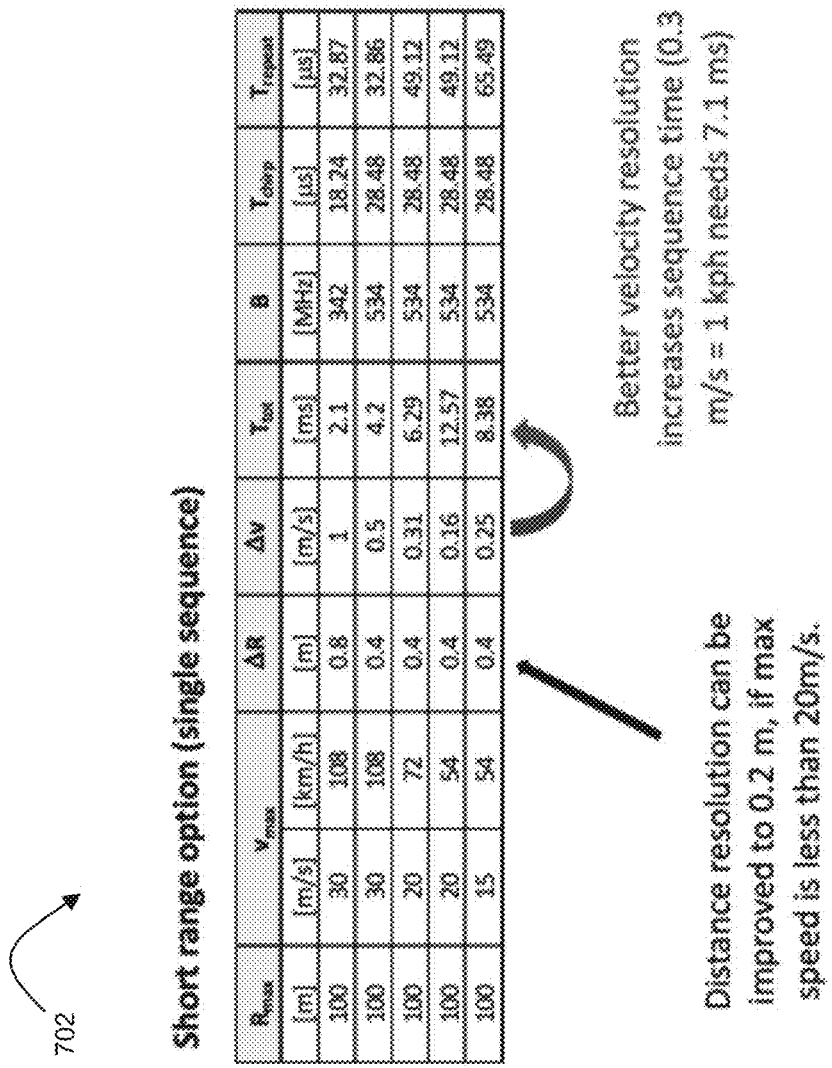
Figure 8A:
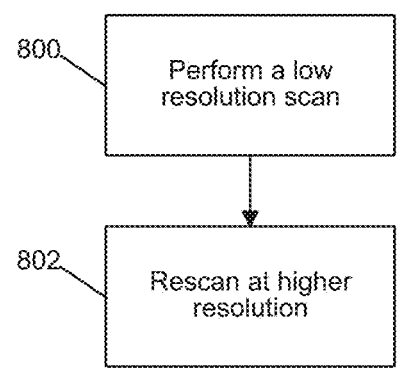

FIGS. 7A-B illustrate an example radar beam that is transmitted by the radar 300 with a narrow main beam 700 capable to reach a long range of 300 m and side lobes that may be reduced with the guard antennas 310 and 314 DSP processing in the DSP module 356 of FIG. 3. FIGS. 8A-B illustrate example scan parameter values 800-802 that may be implemented to achieve narrow beams such as beam 700 of FIGS. 7A-B. These parameters include an azimuth FoV of 44° with a steering beam width of 2°, a step size of 1 indicating approximately 22 steps for a complete scan of the FoV and a chirp time of 18 s. The total chirp segment time for 128 chirps is about 4.2 ms for a complete scan time of the FoV of approximately 93 ms. The maximum range achieved is around 330 m for a range resolution of 1.5 m. And the max velocity is 30 m/s for a velocity resolution of 0.5 m/s. Note that the scan parameters in FIGS. 8A-B are example parameters only; other parameters may be used in alternate implementations.

Figure 9:
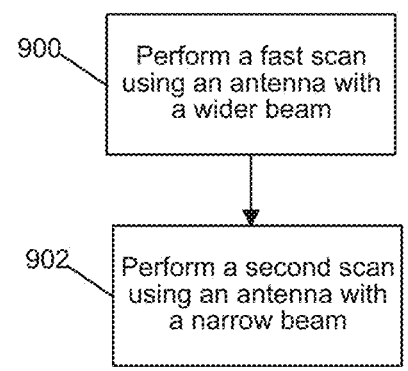
FIG. 9 shows a range doppler map and a frequency spectrum for an echo received by a beam steering radar implemented as in FIG. 3 in accordance with various examples.
Figure 10:
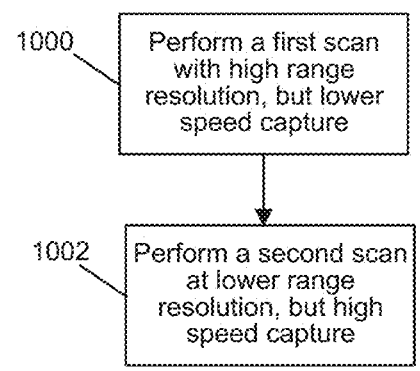
FIG. 10 are range doppler maps for echo received from signals transmitted with a different number of chirps in accordance with various examples.
Figure 11:
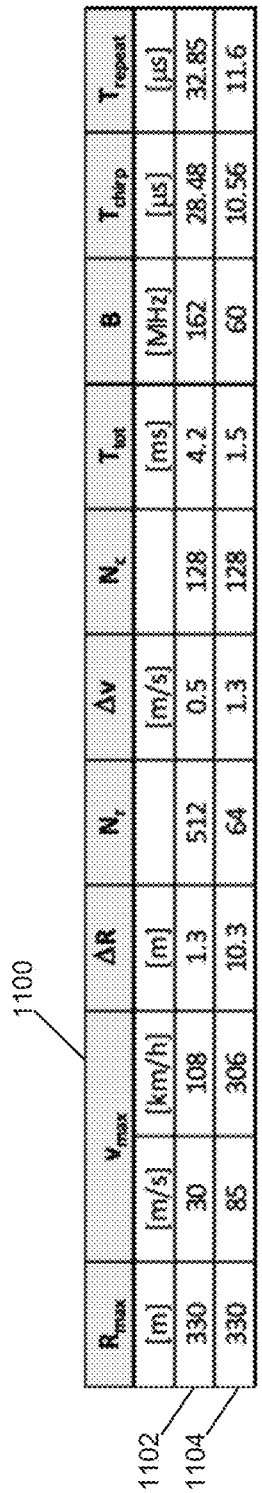
FIG. 11 illustrate frequency spectrum graphs for echoes received from signals transmitted with a different number of chirps in accordance with various examples.

FIG. 9 shows the range-speed velocity pattern and frequency spectrum for a received echo with the scan parameters of FIGS. 7A-B. Note that an object 904 is seen at the range-doppler map 900 and in the peak 906 of the frequency spectrum 902 with an accurate velocity estimation with the velocity resolution of 0.5 m/s. If the number of chirps is reduced in an initial scan of the LRR mode as described in FIG. 6, the velocity estimation is degraded but the object can still be detected. This is seen in FIG. 10, with graph 1000 illustrating the object detected with 64 chirps, graph 1002 illustrating the object detected with 20 chirps, and graph 1004 illustrating the object detected with 5 chirps. The velocity estimation for the object gets worse with a reduced number of chirps as expected. However, the range estimation is still fairly accurate with even 5 chirps, enabling the radar to detect objects significantly faster and then adjust the scan to accurately estimate the velocity of the detected objects. Note that there is no significant difference in the return signal SNR between 5 chirps or 128 chirps, as illustrated in graphs 1100-1102 in FIG. 11. This is critical in validating the use of fewer chirps in a LRR mode.

These various examples support autonomous driving with improved sensor performance, all-weather/all-condition detection, advanced decision-making algorithms and interaction with other sensors through sensor fusion. These configurations optimize the use of radar sensors, as radar is not inhibited by weather conditions in many applications, such as for self-driving cars. The radar described here is effectively a "digital eye," having true 3D vision and capable of human-like interpretation of the world.

It is appreciated that the previous description of the disclosed examples is provided to enable any person skilled in the art to make or use the present disclosure. Various modifications to these examples will be readily apparent to those skilled in the art, and the generic principles defined herein may be applied to other examples without departing from the spirit or scope of the disclosure. Thus, the present disclosure is not intended to be limited to the examples shown herein but is to be accorded the widest scope consistent with the principles and novel features disclosed herein.

As used herein, the phrase "at least one of" preceding a series of items, with the terms "and" or "or" to separate any of the items, modifies the list as a whole, rather than each member of the list (i.e., each item). The phrase "at least one of" does not require selection of at least one item; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

Furthermore, to the extent that the term "include," "have," or the like is used in the description or the claims, such term is intended to be inclusive in a manner similar to the term "comprise" as "comprise" is interpreted when employed as a transitional word in a claim.

A reference to an element in the singular is not intended to mean "one and only one" unless specifically stated, but rather "one or more." The term "some" refers to one or more. Underlined and/or italicized headings and subheadings are used for convenience only, do not limit the subject technology, and are not referred to in connection with the interpretation of the description of the subject technology. All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable sub combination. Moreover, although features may be described above as acting in certain combinations and even initially claimed as such, one or more features from a claimed combination can in some cases be excised from the combination, and the claimed combination may be directed to a sub combination or variation of a sub combination.

The subject matter of this specification has been described in terms of particular aspects, but other aspects can be implemented and are within the scope of the following claims. For example, while operations are depicted in the drawings in a particular order, this should not be understood as requiring that such operations be performed in the particular order shown or in sequential order, or that all illustrated operations be performed, to achieve desirable results. The actions recited in the claims can be performed in a different order and still achieve desirable results. As one example, the processes depicted in the accompanying figures do not necessarily require the particular order shown, or sequential order, to achieve desirable results. Moreover, the separation of various system components in the aspects described above should not be understood as requiring such separation in all aspects, and it should be understood that the described program components and systems can generally be integrated together in a single hardware product or packaged into multiple hardware products. Other variations are within the scope of the following claim.

What is claimed is:

1. A beam steering radar for use in an autonomous vehicle, comprising: a radar module, comprising:
    at least one beam steering antenna;
    a transceiver; and
    a controller configured to cause the transceiver to:
        perform, using the at least one beam steering antenna, a first scan of a field-of-view (FoV) at a first detection range with a first number of chirps in a first radio frequency (RF) signal;
        in response to receiving an echo identifying an object in the FOV, focusing the at least one beam antenna at a set of range bins associated with the object;
        determining a velocity estimate of the object;
        calculating a second number of chirps to achieve an increased velocity resolution of a measurement of the object; and
        perform a second scan of a portion of the FoV focused on the set of range bins associated with the object with a second number of chirps different from the first number of chirps in a second RF signal, wherein the first detection range equals the second detection range; and a perception module comprising a machine learning-trained classifier configured to detect one or more objects in a path and surrounding environment of the autonomous vehicle based on the first number of chirps in the first RF signal and classify the one or more detected objects based on the second number of chirps in the second RF signal, wherein the perception module is configured to transmit object data and radar control information to the radar module.

2. The beam steering radar of claim 1, wherein the second number of chirps is greater than the first number of chirps.

3. The beam steering radar of claim 1, wherein the controller is further configured to determine a velocity resolution of the one or more objects from the object data, wherein the velocity resolution is inversely proportional to a total time for a chirp sequence.

4. The beam steering radar of claim 1, wherein the controller is further configured to obtain a first velocity resolution of the one or more objects from the object data that corresponds to the first number of chirps in the first RF signal and obtain a second velocity resolution different from the first velocity resolution of the one or more objects from the object data that corresponds to the second number of chirps in the second RF signal.

5. The beam steering radar of claim 4, wherein the second velocity resolution has a value less than that of the first velocity resolution.

6. The beam steering radar of claim 1, wherein the perception module is further configured to detect the one or more objects in a first duration from radar data that corresponds to the first number of chirps in the first RF signal and classify the one or more objects in a second duration different from the first duration from radar data that corresponds to the second number of chirps in the second RF signal.

7. The beam steering radar of claim 6, wherein the second duration is greater than the first duration.

8. The beam steering radar of claim 1, wherein the second RF signal is transmitted through the at least one beam steering antenna at a time subsequent to that of a transmission of the first RF signal.

9. The beam steering radar of claim 1, wherein the transceiver is configured to perform the first scan of the FoV at a first beam scanning rate based on the first number of chirps in the first RF signal and perform the second scan of the FoV at a second beam scanning rate different from the first beam scanning rate based on the second number of chirps in the second RF signal.

10. The beam steering radar of claim 9, wherein the first beam scanning rate is greater than the second beam scanning rate.

11. The beam steering radar of claim 1, wherein the controller is further configured to cause the transceiver to perform the first scan and the second scan based on a set of scan parameters that is adjustable to produce a plurality of transmission beams through the at least one beam steering antenna.

12. The beam steering radar of claim 11, wherein the set of scan parameters includes one or more of a total angle of a scan area defining the FoV, a beam width of each of the plurality of transmission beams, a scan angle of each of the plurality of transmission beams, indication of the first number of chirps in the first RF signal, indication of the second number of chirps in the second RF signal, a chirp time, a chirp segment time, or a chirp slope.

13. A method of object detection and classification, comprising:
- transmitting, at a transceiver using at least one beam steering antenna, a first transmission beam comprising a first number of chirps at a first time, thereby scanning a field-of-view (FOV) at a first detection range;
- receiving, at the transceiver through the at least one beam steering antenna, a first reflected signal associated with the first transmission beam;
- detecting an object from the first reflected signal;
- focusing the at least one beam steering antenna at range bins associated with the object;
- transmitting, at the transceiver using the at least one beam steering antenna, a second transmission beam comprising a second number of chirps greater than the first number of chirps at a second time subsequent to the first time, thereby scanning the FOV at a second detection range that equals the first detection range; and
- classifying, using the perception module, the object from a second reflected signal associated with the second transmission beam based on the second number of chirps in the second transmission beam.

14. The method of claim 13, wherein the classifying the object comprises calculating a velocity resolution of the object from object data, wherein the velocity resolution is inversely proportional to a total time for a chirp sequence.

15. The method of claim 13, wherein the classifying the object comprises calculating a first velocity resolution of the object from object data that corresponds to the first number of chirps in the first transmission beam and obtain a second velocity resolution having a value less than that of the first velocity resolution of the object from object data that corresponds to the second number of chirps in the second transmission beam.

16. The method of claim 13, wherein:
- the detecting the object comprises detecting the object in a first duration from radar data that corresponds to the first number of chirps in the first transmission beam, and
- the classifying the object comprises classifying the object in a second duration greater than the first duration from radar data that corresponds to the second number of chirps in the second transmission beam.

17. The method of claim 13, wherein:
- the transmitting the first transmission beam comprises performing a first scan of the FoV at a first beam scanning rate based on the first number of chirps in the first transmission beam, and
- the transmitting the second transmission beam comprises performing a second scan of the FoV at a second beam scanning rate less than the first beam scanning rate based on the second number of chirps in the second transmission beam.

18. The method of claim 17, wherein the first scan and the second scan are performed based on a set of scan parameters that is adjustable to produce a plurality of transmission beams through the at least one beam steering antenna, wherein the set of scan parameters includes one or more of a total angle of a scan area defining the FoV, a beam width of each of the plurality of transmission beams, a scan angle of each of the plurality of transmission beams, indication of the first number of chirps in the first transmission beam, indication of the second number of chirps in the second transmission beam, a chirp time, a chirp segment time, or a chirp slope.

19. An autonomous driving system, comprising:
- a non-transitory memory; and
- one or more hardware processors coupled to the non-transitory memory and configured to execute instructions from the non-transitory memory to cause the autonomous driving system to perform operations comprising:
  - performing a first scan of a field-of-view (FoV) at a first maximum range at a first beam scanning rate using a first number of chirps in a first transmission beam;
  - in response to receiving an echo identifying an object in the FOV, focusing the at least one beam antenna at a set of range bins associated with the object;
  - determining a velocity estimate of the object;
  - calculating a second number of chirps to achieve an increased velocity resolution of a measurement of the object; and
  - detecting an object in a first received reflected signal based on the first number of chirps in the first transmission beam;
  - performing a second scan focused on the set of range bins associated with the object at a second maximum range at a second beam scanning rate different from the first beam scanning rate using a second number of chirps different from the first number of chirps in a second transmission beam, wherein the first maximum range equals the second maximum range; and
  - classifying the object from a second received reflected signal associated with the second transmission beam based on the second number of chirps in the second transmission beam.

20. The autonomous driving system of claim 19, wherein:
- the first number of chirps is less than the second number of chirps, and
- the second beam scanning rate is lesser than the first beam scanning rate.

* * * * *